United States Patent [19]

Hedrick

[11] 4,090,408
[45] May 23, 1978

[54] FLUID QUANTITY INDICATOR

[76] Inventor: Geoffrey S. Hedrick, Laurel Cir., Malvern, Pa. 19355

[21] Appl. No.: 731,229

[22] Filed: Oct. 12, 1976

[51] Int. Cl.² ............................................. G01F 23/26
[52] U.S. Cl. ................................................. 73/304 C
[58] Field of Search ................ 73/304 C; 340/347 CC; 324/60 C

[56] References Cited

U.S. PATENT DOCUMENTS

| | | | |
|---|---|---|---|
| 3,083,572 | 4/1963 | Pearson | 73/304 C |
| 3,237,178 | 2/1966 | Valentine | 73/304 C X |
| 3,316,751 | 5/1967 | Burk | 340/347 CC X |
| 3,746,975 | 7/1973 | Maltby | 73/304 C X |
| 3,768,006 | 10/1973 | Mueller | 73/304 C X |
| 3,830,090 | 8/1974 | Hersch et al. | 73/304 C X |
| 3,984,830 | 10/1976 | Buchanan et al. | 340/347 CC X |

*Primary Examiner*—Richard C. Queisser
*Assistant Examiner*—John S. Appleman
*Attorney, Agent, or Firm*—Hubbell, Cohen, Stiefel & Gross

[57] ABSTRACT

An improved fluid quantity indicator, such as for aviation fuel, of the type utilizing capacitive type sensing probes in which a capacitance change occurs proportional to the amount of fluid in a tank due to the dielectric constant of the fluid, such as aviation fuel, being different from that of air, in which the improvement comprises automatic compensation for the zero fluid capacitance variation in a tank and automatic adjustment of the fluid full scale reading for variation in fluid tank capacitance. Programmable digital to analog convertors are utilized to provide a universal apparatus full scale set compensation for containers for the fluid substantially independent of the container configuration for compensating for variation in full scale capacitance of a given container and to provide a universal apparatus zero set compensation for containers for the fluid substantially independent of the container configuration for compensating for variations in zero fluid capacitance of a given container. An up/down counting means together with a digital display is utilized for providing an indication of the fluid quantity, the reference probe signal and the sensing probe signal being preferably summed with the zero set biasing signal in a servo control loop with the counting means for providing the digital display of fluid quantity, the loop being nulled when the counting means output is equivalent to the fluid quantity to provide a container configuration independent real time digital display of fluid quantity within a given container or tank.

15 Claims, 1 Drawing Figure

FLUID QUANTITY INDICATOR

BACKGROUND OF THE INVENTION

1. Field of the Invention

The present invention relates to apparatus for indicating the quantity of fluid contained within a container therefor.

2. Description of the Prior Art

Prior art fluid quantity indicators, such as the type utilized for providing an indication of the quantity of aviation fuel in a given tank, are normally dependent on the particular unique fuel tank configuration in which the indicator is being utilized. These aircraft fuel sensor probes are generally of the capacitive type, such as where the sensing element or probe comprises a concentric tube capacitor, such as disclosed by way of example in U.S. Pat. Nos. 2,866,337 and 3,534,606, preferably mounted in the vertical position in the tank, or in multiples within the tank to average out variations in pitch of the aircraft, and another capacitor, utilized as a reference capacitor, lying in a horizontal position in the bottom of the tank. A capacitance change, in such prior art fluid quantity indicators, occurs proportional to the amount of fluid or fuel in the tank since the dielectric constant of aviation fuel, by way of example, is different from that of air. This reference capacitor probe located in the bottom of the tank, normally remains submerged at all times and compensates for variation of the dielectric constant of the fuel with changes in temperature, pressure, and fuel type. In such prior art fuel quantity indicators, the sensing elements and the reference capacitors in the tank are normally not held to a precise zero fuel and full tank capacitance and, accordingly, since these values change from aircraft to aircraft for the same tank; a zeroing adjustment of the fuel quantity indicator is required at each installation of an indicator. In addition, a different full scale factor must be set for each type or capacity tank. Accordingly, depending upon the failure rate of the fluid quantity indicator, a substantial amount of time in rezeroing the indicators and in resetting the scale factor is expended since the indicator has to be zeroed upon replacing a failed unit and the scale factor has to be set for each different capacity fuel tank. On an average, there are three to four fuel tanks per aircraft with a varying fuel capacity and variable changes in capacitance per unit volume so that in a given aircraft fuel tank, such as one having a 10,000 pound fuel capacity, the tank might have a capacitance change of the sensor from empty to full of 1,000 picofarads and another fuel tank on the same aircraft might have a fuel capacity of 80,000 pounds with an identical probe capacitance change. This lack of standardization of capacitance change versus fuel quantity requires a separate indicator for each tank with its full scale indication adjusted for the appropriate capacitance change of that fuel tank. Accordingly, this lack of standardization in prior art fuel quantity indicators which make them fuel tank dependent requires the maintenance of a large inventory of such indicators for use in several different types of aircraft with different capacity fuel tanks. Furthermore, prior art fuel quantity indicators have generally previously been primarily analog systems which, in the field of airborne instrumentation, primarily utilize moving parts which are normally less reliable than systems without such moving parts, particularly when subjected to extreme environmental conditions and have not been satisfactorily lightweight and compact. In an attempt to overcome some of these disadvantages, some recent prior art fluid quantity indicators have been digital systems, such as the type disclosed in U.S. Pat. Nos. 3,301,056 and 3,463,980, as opposed to analog systems, such as the analog servo bridge type of system, such as disclosed in U.S. Pat. No. 3,079,797. These digital prior art systems, however, suffer from the same disadvantage of the prior art analog systems with respect to being dependent on the particular fuel tank configuration so that the scale factor and the zero set for a given fuel tank has to be accomplished each time a new indicator is installed and/or is utilized in a different capacity fuel tank. These disadvantages of the prior art are overcome by the present invention.

SUMMARY OF THE INVENTION

An improved apparatus responsive to the quantity of a fluid within a container therefore of predetermined volume, in which the apparatus comprises a capacitive sensing means disposed within the container volume so as to be immersible within the fluid and any air within the container volume, the capacitive sensing means having an associated variable dielectric constant which is proportional to the proportionate amount of fluid within the container volume, the sensing means capacitance varying in accordance with the variation in the proportionate amount of fluid and a reference capacitive means disposed within the container so as to normally be immersible within the fluid and responsive to variations in the dielectric constant of the fluid due to environmental conditions, utilizes an up/down counting means and a digital display for providing a digital read out of the quantity of fluid within the tank and programmable digital to analog convertors for both the scale factor and the zero set for the fuel tank in an all digital system to provide a container configuration independent real time digital display of fluid quantity within a given container. A servo control loop is provided which is nulled when the counting means output is equivalent to the fluid quantity. The digital system includes the up/down counting means for providing an output signal indicative of the fluid quantity; a first computing digital to analog convertor having a magnitude input operatively connected in parallel to the counter output for providing an output in response to the input which output is operatively connected to the reference capacitor and comprises a signal of predetermined phase and frequency; the programmable digital to analog convertor for providing the full scale set compensation or factor for the indicator, this convertor being connected to the computing digital to analog convertor for providing a reference magnitude signal thereto; an AC source, such as sine wave generator connected to the sensing capacitor and to the full scale set and zero set convertors, the reference signal output of the full scale set convertor being identical in frequency and opposite in phase to the output of the sine wave generator; a differential amplifier summing means having an input connected to both the sensing capacitor and reference capacitor outputs and preferably to the zero set biasing signal output of the zero set convertor for summing these outputs; and means for providing a directional counting signal output in response to the summing means output, such as a demodulator for selecting the quadrature current of the summed signal and gating means for determining a direction for the counting signal, this counting signal being supplied to the up/down counter for providing the digital display of the fluid quantity in the tank. The AC reference source, reference and sensing capacitors, summing means, directional counting signal providing means, up/down counter and the computing digital to analog convertor form the servo loop previously described to provide a container configuration independent real time digital display of the fluid quantity within a given container. In addition, the summed output signal may also be 0° reference demodulated for detecting fluid contamination, such as water within the aviation fuel, the water having a 0° reference resistance current occurring which is detected to provide an indication, such as an alarm, of contamination above a predetermined level within the fuel tank. By taking the quadrature current associated with the summing means output for providing the directional counting signal, which is by means of a 90° reference demodulation, the 0° reference resistance current associated with the contamination within the fuel tank is eliminated from the directional counting signal provision.

BRIEF DESCRIPTION OF DRAWING

The single FIGURE, is a block diagram, partially in schematic of the preferred embodiment of the improved fluid quantity indicator in accordance with the present invention.

DETAILED DESCRIPTION OF THE PREFERRED EMBODIMENT

Figure 1:
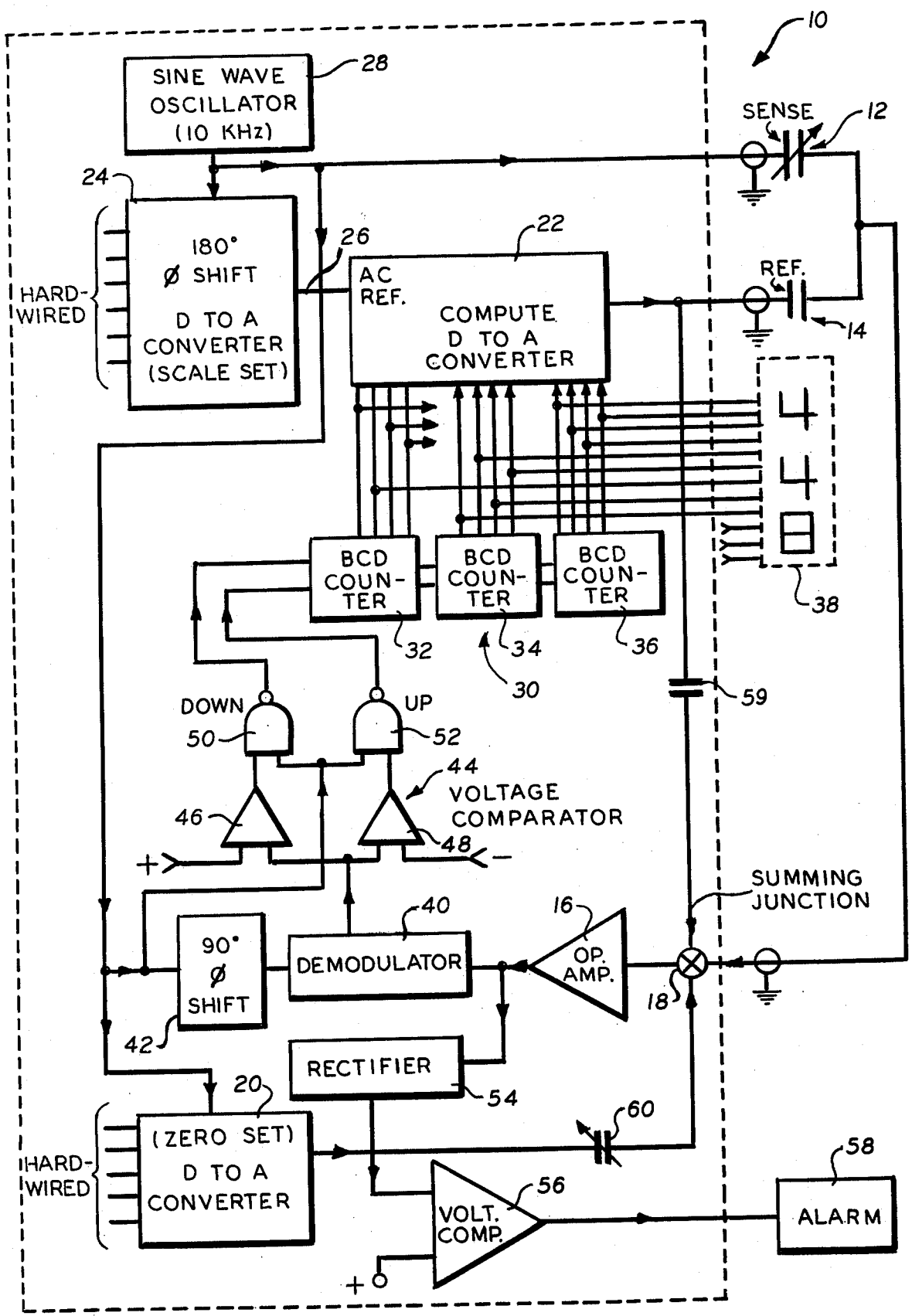

Referring now to the drawing in detail, an improved fluid quantity indicator in accordance with the present invention, generally referred to by the reference numeral 10, preferably includes a sensing capacitor 12, such as a conventional parallel plate concentric tube capacitor, which is preferably mounted in the vertical position in a tank for the fluid. For purposes of explanation, this system 10 is preferably utilized for detecting the presence of aviation fuel within a tank therefor, although, if desired, any type of fluid may be detected within a container or tank therefor with appropriate conventional modifications for the dielectric constant thereof. Accordingly, the system 10 shall be described in terms of the fluid preferably being aviation fuel. The conventional sensing capacitor 12 is preferably located in the fluid or fuel to be sensed so that the dielectric between its electrodes changes as the fluid replaces the air. A reference capacitor 14 is also preferably located in the fuel tank, such as preferably in a horizontal position in the bottom of the tank so as to normally remain submerged at all times. A capacitance change occurs proportional to the amount of fuel or fluid in the tank since the dielectric constant of aviation fuel, by way of example, is different from that of air. The reference probe or capacitor 14 compensates for variations of this dielectric constant of the fuel with changes in temperature, pressure and fuel type. As will be described in greater detail hereinafter, the signal supplied to the reference probe or capacitor 14 is preferably opposite in phase but identical in frequency with the signal supplied to the sensing probe or capacitor 12, these two signals, as will be described in greater detail hereinafter, preferably being summed at a high gain operational amplifier 16 summing junction 18. As shown and preferred in FIG. 1, a conventional linear regression capacitor 59 is connected in parallel with the reference probe 14 in order to compensate for the temperature coefficient of the fuel's chemistry.

The indicator system 10 also preferably includes a digital to analog convertor 20 which feeds a bias signal to the summing junction through capacitor 60 for summing with the sensing capacitor 12 and reference capacitor 14 output signals. The magnitude of this bias signal is preferably controlled by the programmable convertor 20, such as by hard-wire programming the convertor 20 in conventional fashion, the convertor 20 being, by way of example, such as of the type manufactured by Hybrid Systems under designation 331-10. The convertor 20 is preferably programmed in conventional fashion to select a bias signal sufficient to zero out or zero set the indicator 10 and, since the empty tank capacitance does not change except if the major structural tank is altered, this zero bias or zero set information which is hard-wired will automatically feed the zero bias through the digital to analog zero set convertor 20. Thus, the convertor 20 may be programmed in conventional fashion to be fuel tank configuration independent so that once it is set, it does not have to be reset when a new indicator is installed in a fuel tank.

As will be described in greater detail hereinafter, the indicator system 10 also preferably includes a conventional multiplying digital to analog convertor 22, such as a 331-10 convertor manufactured by Hybrid Systems. Another multiplying digital to analog convertor, such as a 331-10 convertor manufactured by Hybrid Systems, is utilized to provide the reference magnitude of the computing digital to analog convertor 22, convertor 24 also preferably being conventionally programmed, such as by rear connector programming to provide the proper full scale reading of the indicator and to compensate for variations in the full scale capacitance of the fuel tank, convertor 24 automatically adjusting the reference voltage provided via path 26 to the computing digital to analog convertor 22. Thus, convertor 24 is termed the scale set convertor. Convertor 24 enables the use of a single indicator in all tank configurations. The indicator system 10 also preferably includes an AC reference signal source, such as one providing a carrier signal of 10 kilohertz, by way of example, from a conventional sine wave oscillator 28. This AC reference signal output of oscillator 28 has a predetermined phase and frequency and is provided in parallel to the sensing probe or capacitor 12 and to convertors 20 and 24. This reference signal is preferably phase shifted 180° by convertor 24 to provide an AC reference signal via path 26 to computing digital to analog convertor 22 which is opposite in phase and identical in frequency with the reference signal provided to sensing capacitor 12, the outputs of sensing capacitor 12 and reference capacitor 14 being equal in frequency and opposite in phase.

A conventional up/down binary coded decimal counter 30, such as preferably a three digit binary coded decimal counter comprising stages 32, 24 and 36, with one stage being provided per digit, as will be described in greater detail hereinafter, preferably provides a count which is representative of the quantity of fluid or fuel within the tank. The output of the counter 30 is preferably connected to a conventional digital display 38, such as a solid state light emitting diode display or a mixie tube display which, in the example shown, is a three digit display. Of course, if the indicator 10 is to be utilized for fuel tanks having a greater capacity than capable of being indicated by a three digit display, the counter 30 may contain additional stages for providing the additional digits and the display 38 may contain an appropriate number of additional digit display positions.

As will be described in greater detail hereinafter, the summing output of the operational amplifier 16 is preferably provided to a conventional demodulator 40, which is provided with the AC reference signal output of oscillator 28 phase shifted 90° by a conventional 90° phase shifter 42 to provide a carrier signal which is 90° phase shifted from the reference signal for demodulating the output of the operational amplifier 16. Thus, as previously mentioned, for purposes of generating the directional counting signal, preferably only the quadrature current associated with the summing output of operational amplifier 16 is looked at. The output of demodulator 40 is connected in parallel to a conventional voltage comparator 44 which comprises a pair of conventional threshold detectors 46 and 48 having a positive and a negative, respectively, reference threshold value. The output of positive threshold detector 46 of comparator 44 preferably provides one input to a conventional two input NAND gate 50 termed the down gate for the logic chosen and the output of negative threshold detector 48 of comparator 44 is supplied as one input to another conventional two input NAND gate 52 termed the up gate for the logic chosen. The clock enable pulse for gates 50 and 52 is connected to the other inputs thereto and is the reference signal output of oscillator 28 provided in parallel thereto. Gates 50 and 52, threshold detectors 46 and 48 and demodulator 40 cooperate to provide the directional counting signal to counter 30, as will be described in greater detail hereinafter.

The indication of fuel or fluid quantity within the tank is preferably provided by the indicator system 10 in the following manner. The scaled frequency signal output of convertor 24 is fed via path 26 to the computing digital to analog convertor 22 which receives its magnitude signal from the up/down counter 30 stages 32, 34, 36 in parallel as this output is provided to digital display 38. the output of convertor 22 is fed through the reference probe or capacitor 14 of the tank while a signal of opposite phase, but identical frequency, is fed to the sensing probe or capacitor 12 from oscillator 28. These two signal outputs of sensing capacitor 12 and reference capacitor 14 are preferably summed at the high gain operational amplifier 16 summing junction 18. As previously mentioned, zero set convertor 20 preferably feeds a zero set bias signal to the sensing loop circuit at summing junction 18. When the magnitude of the output signal of computing digital to analog convertor 22 is equal to the magnitude of the sensing capacitor 12 output signal, the output of the operational amplifier 16 will be zero since these two signals are opposite in phase. The output of operational amplifier 16 which is the magnitude of the difference between the digital to analog signal to the reference probe 14 and the fixed reference signal provided from oscillator 28 to the sensing probe 12 is 90° reference demodulated by demodulator 40 and fed to the voltage comparator 44 which provides an up or down direction dependent on the error signal at the output of operational amplifier 16 and appropriately gates the counting clock signal provided from oscillator 28 to the appropriate gate 50 or 52 depending on the direction determined by the comparator 44 through the up/down counter 30 and, therefrom, to the computing digital to analog convertor 22 which will count in the appropriate direction to achieve null. When the sensing loop, which may be termed a "servo control loop" is at null, the signal feeding the computing digital to analog convertor 22 from the up/down counter 30 is the binary coded decimal equivalent of the quantity, such as the number of pounds of fuel or fluid in the tank. This binary coded decimal signal is decoded and displayed in conventional fashion by the solid state decimal read out 38, such as one comprising light emitting diodes.

As was previously mentioned, the zero biasing signal being fed into the summing junction 18 of the error operational amplifier signal 16 sets the appropriate zero for that fuel tank configuration being utilized. Thus, the null balancing technique operates with a carrier signal provided from the oscillator 28, such as a typical carrier signal of 10 kilohertz. Since the current through the capacitor 12 is proportional to the magnitude of the capacitance, a change in capacitance will change the current flowing through the probe. This current flow is proportional to the magnitude of the capacitance times the frequency times the voltage applied to the probe. The computing digital to analog convertor 22 nulls a change in sensing probe 12 capacitance by changing the applied voltage to probe 14 and balancing the current through the reference 14 and sensing probes 12. Since the current through the probes if the probes are purely capacitive, as is preferred, is 90° out of phase with respect to the applied voltage, the error signal present at the output of operational amplifier 16 is demodulated with the carrier signal which is 90° phase shifted from the reference signal, as previously mentioned. Any contamination present in the fuel tank in the form of water provides a resistance current path which resistance current, or real component current, is 0° in phase relationship with respect to the reference signal. This reference signal is, accordingly, eliminated as a quadrature signal in the demodulator 40 so that the effects of the resistance leakage path in the probes 12 and 14 and interconnect wiring are minimized.

As shown and preferred in the FIGURE, the output of the summing operational amplifier 16 is also preferably fed in parallel to a conventional rectifier 54 which functions as a 0° reference demodulator, whose output is preferably fed to a conventional voltage comparator or threshold detector 56 which preferably senses high residual null at the output of operational amplifier 16. Since the 90° component, or reactive component of the error signal is held in a null condition by the up/down counter 30, the residual null is the 0° component, or the real component whose magnitude is proportional to the amount of contaminant, such as water, in the tank. The real component of the currents passing through the capacitor is isolated from the reactive component in this manner and threshold detected to provide an indication of the presence of contaminants within the tank, such as water, above a predetermined allowable level. This indication may be provided by means of a calibrated display or, as shown and preferred, by means of a conventional alarm 58, such as a light emitting diode, which turns on when the leakage current exceeds this predetermined allowable value associated with a predetermined quantity of contaminant in the tank. Preferably, the fluid contaminant network 54, 56, 58, will be equally responsive to a large quantity of water uncontaminated with acidic excretion, such as resulting from bacteria present in the tank which grows on the film boundaries between water and aviation fuel, or a small quantity of water contaminated with this acidic excretion, as both provide the same conductivity and cause the same increase in value of the real component of the error signal current. If desired, this fluid contaminant network 54, 56, 58 may be omitted; however, it is most preferred in aircraft installations in which there are problems associated with bacteria which normally grows on film boundaries between water and aviation fuel as this bacteria excretes an acidic compound which has a high corrosive effect on the aluminum tank structure and can cause significant damage to the structure of the aircraft and, furthermore, a large quantity of water uncontaminated with acidic excretion or a small quantity of water contaminated with the acidic excretion are equally hazardous in the fuel tank of an aircraft.

Thus, by utilizing the fuel quantity indicator of the present invention, a real time digital display of fluid quantity within a given container which is independent of the configuration of the container or tank for the fuel may be provided and, in addition, an indication of hazardous contaminants within the fuel in the tank may also be provided.

It is to be understood that the above described embodiment of the invention is merely illustrative of the principles thereof and that numerous modifications and embodiments of the invention may be derived within the spirit and scope thereof.

What is claimed is:

1. In an apparatus responsive to the quantity of fluid within a container therefor of a predetermined volume, said apparatus comprising a capacitive sensing means disposed within said container volume so as to be immersible within said fluid and any air within said container volume, said capacitive sensing means having an associated variable dielectric constant, said dielectric constant being proportional to the proportionate amount of fluid within said container volume, said sensing means capacitance varying in accordance with the variation in said porportionate amount of fluid; a reference capacitive means disposed within said container so as to normally be immersible within said fluid and responsive to variations in the dielectric constant of said fluid due to environmental conditions; the improvement comprising AC reference means operatively connected to said sensing means for providing a signal having a predetermined phase and frequency and voltage thereto, a current proportional to the capacitance of said sensing means flowing through said sensing means in response to said provided AC reference means signal; up/down counting means for providing an output signal indicative of said fluid quantity; first computing digital to analog conversion means having a magnitude input operatively connected in parallel to said counting means output for providing an output in response to said input, said conversion means output being operatively connected to said reference capacitive means for providing a voltage thereto, said output comprising a signal having a predetermined voltage and phase and opposite to said AC reference means signal phase and a predetermined frequency identical therewith; second digital to analog conversion means operatively connected to said first conversion means for providing a reference magnitude signal thereto, said reference magnitude signal providing a full scale set for said apparatus, said second conversion means being programmable to provide a universal apparatus full scale set compensation for containers for said fluid substantially independent of said container configuration for compensating for variations in full scale capacitance of a given container; differential amplifier summing means having an input operatively connected to said capacitive sensing means and said capacitive reference means output for summing the output signals provided therefrom; means operatively connected to said summing means output for providing a directional counting signal output in response to said summing means output, said counting signal output being operatively connected to said counting means for counting in response to said counting signal, said counting means output being operatively connected to a digital display means for providing a digital display of said fluid quantity in response to said counting means output; said AC reference means, capacitive sensing means, capacitive reference means, summing means, directional counting signal providing means, counting means and first conversion means comprising a servo control loop which is nulled when said counting means output is equivalent to said fluid quantity, said servo control loop varying said voltage applied to said capacitive reference means for nulling out the current flowing through said capacitive sensing means, whereby a container configuration independent real time digital display of fluid quantity within a given container which is capacitive leakage independent is provided.

2. An apparatus in accordance with claim 1 further comprising third digital to analog conversion means operatively connected to said summing means input for providing a predetermined biasing signal thereto for zero setting said apparatus, said third conversion means being programmable to provide a universal apparatus zero set compensation for containers for said fluid substantially independent of said container configuration for compensating for variations in zero fluid capacitance of a given container.

3. An apparatus in accordance with claim 2 wherein said directional counting signal providng means comprises 90° phase shifter means having its input connected in parallel to said AC reference signal means output for providing said AC reference signal phase shifted 90° as an output therefrom; demodulator means operatively connected to said 90° phase shifter output and said summing means output for providing an output signal therefrom representative of the quadrature current associated with said summing means output; and means operatively connected to said demodulator means output and said AC reference signal output for providing said directional counting signal output in response thereto.

4. An apparatus in accordance with claim 3 wherein said means for providing said directional counting signal output in response to said demodulator means and AC reference signal outputs comprises comparator means for comparing said demodulator means output with a reference for determining direction for said counting signal and gating said direction determined directional counting means, whereby said counting means counts up or down dependent on said determined direction of said gated directional counting signal.

5. An apparatus in accordance with claim 3 further comprising fluid contamination detecting means for detecting resistance current associated with said fluid contamination, said demodulator means eliminating said resistance current from said summing means output, said detecting means being connected in parallel to said summing means output; said detecting means comprising rectifier means for 0° reference demodulating said summing means output to detect said resistance current, threshold detector means for providing an output signal proportional to said resistance current and indicator means for providing an indication of said contamination in response to said threshold detector means output.

6. An apparatus in accordance with claim 2 wherein said second conversion means is operatively connected in parallel to said AC reference signal output and comprises means for providing a 180° phase shift for said AC reference signal as said second conversion means reference magnitude signal, said reference magnitude signal phase and frequency being identical with said conversion means output signal phase and frequency.

7. An apparatus in accordance with claim 2 further comprising fluid contamination detecting means for detecting resistance current associated with said fluid contamination, said detecting means being connected in parallel to said summing means output; said detecting means comprising rectifier means for 0° reference demodulating said summing means output to detect said resistance current, threshold detector means for providing an output signal proportional to said resistance current and indicator means for providing an indication of said contamination in response to said threshold detector means output.

8. An apparatus in accordance with claim 2 wherein said fluid is aviation fuel and said container is a tank therefor.

9. An apparatus in accordance with claim 1 wherein said second conversion means is operatively connected in parallel to said AC reference signal output and comprises means for providing a 180° phase shift for said AC reference signal as said second conversion means for reference magnitude signal, said reference magnitude signal phase and frequency being identical with said first conversion means output signal phase and frequency.

10. An apparatus in accordance with claim 1 wherein said fluid is aviation fuel and said container is a tank therefor.

11. In an apparatus responsive to the quantity of a fluid within a container therefor of predetermined volume, said apparatus comprising a capacitive sensing means disposed within said container volume so as to be immersible within said fluid and any air within said container volume, said capacitive sensing means having an associated variable dielectric constant, said dielectric constant being proportional to the proportionate amount of fluid within said container volume, said sensing means capacitance varying in accordance with the variation in said proportionate amount of fluid; a reference capacitive means disposed within said container so as to normally be immersible within said fluid and responsive to variations in the dielectric constant of said fluid due to environmental conditions; the improvement comprising AC reference means operatively connected to said sensing means for providing a signal having a predetermined phase and frequency and voltage thereto, a current proportional to the capacitance of said sensing means flowing through said sensing means in response to said provided AC reference means signal; up/down counting means for providing an output signal indicative of said fluid quantity; first computing digital to analog conversion means having a magnitude input operatively connected in parallel to said counting means output for providing an output in response to said input, said conversion means output being operatively connected to said reference capacitive means for providing a voltage thereto, said output comprising a signal having a predetermined voltage and phase and opposite to said AC reference means signal phase and a predetermined frequency identical therewith; differential amplifier summing means having an input operatively connected to said capacitive sensing means and said capacitive reference means outputs for summing the output signals provided therefrom; means operatively connected to said summing means output for providing a directional counting signal output in response to said summing means output, said counting signal output being operatively connected to said counting means for counting in response to said counting signal, said counting means output being operatively connected to a digital display means for providing a digital display of said fluid quantity in response to said counting means output; said AC reference means, capacitive sensing means, capacitive reference means, summing means, directional counting signal providing means, counting means and first conversion means comprising a servo control loop which is nulled when said counting means output is equivalent to said fluid quantity, said servo control loop varying said voltage applied to said capacitive reference means for nulling out the current flowing through said capacitive sensing means; and second digital to analog conversion means operatively connected to said summing means input for providing a predetermined biasing signal thereto for zero setting said apparatus, said third conversion means being programmable to provide a universal apparatus zero set compensation for containers for said fluid substantially independent of said container configuration for compensating for variations in zero fluid capacitance of a given container; whereby a container configuration independent real time digital display of fluid quantity within a given container which is capacitive leakage independent is provided.

12. An apparatus in accordance with claim 11 wherein said directional counting signal providing means comprises 90° phase shifter means having its input connected in parallel to said AC reference signal means output for providing said AC reference signal phase shifted 90° as an output therefrom; demodulator means operatively connected to said 90° phase shifter output and said summing means output for providing an output signal therefrom representative of the quadrature current associated with said summing means output; and means operatively connected to said demodulator means output and said AC reference signal output for providing said directional counting signal output in response thereto.

13. An apparatus in accordance with claim 12 wherein said means for providing said directional counting signal output in response to said demodulation means and AC reference signal outputs comprises comparator means for comparing said demodulator means output with a reference for determining direction for said counting signal and gating said direction determined directional counting signal to said counting means, whereby said counting means counts up or down dependent on said determined direction of said gated directional counting signal.

14. An apparatus in accordance with claim 12 further comprising fluid contamination detecting means for detecting resistance current associated with said fluid contamination, said demodulator means eliminating said resistance current from said summing means output, said detecting means being connected in parallel to said summing means output; said detecting means comprising rectifier means for 0° reference demodulating said summing means output to detect said resistance current, threshold detector means for providing an output signal proportional to said resistance current and indicator means for providing an indication of said contamination in response to said threshold detector means output.

15. An apparatus in accordance with claim 11 further comprising fluid contamination detecting means for detecting resistance current associated with said fluid contamination, said demodulator means eliminating said resistance current from said summing means output, said detecting means being connected in parallel to said summing means output; said detecting means comprising rectifier means for 0° reference demodulating said summing means output to detect said resistance current, threshold detector means for providing an output signal proportional to said resistance current and indicator means for providing an indication of said contamination in response to said threshold detector means output.

* * * * *